W. A. O'BANNON

VALVE CASE AND THE METHOD OF PRODUCING THE SAME

Nov. 5, 1929. Re. 17,481

Original Filed May 3, 1928

Inventor
W. A. O'Bannon

By Robb & Robb
Attorneys

Reissued Nov. 5, 1929

Re. 17,481

UNITED STATES PATENT OFFICE

WALTER A. O'BANNON, OF TULSA, OKLAHOMA, ASSIGNOR TO WALTER O'BANNON CO., OF TULSA, OKLAHOMA

VALVE CASE AND THE METHOD OF PRODUCING THE SAME

Original application filed May 18, 1927, Serial No. 192,370. Patent No. 1,714,434, dated May 21, 1929, which was divided and application filed May 3, 1928, Serial No. 274,857. Original No. 1,714,398, dated May 21, 1929. Application for reissue filed July 6, 1929. Serial No. 376,417.

This invention relates to a valve case and the method of producing the same, and comprising a division of my application for working barrel filed May 18, 1927, Serial No. 192,370, issued May 21, 1929, No. 1,714,434.

This invention relates to a class of valves used in oil pumping operations where very high pressures are present and the case is adapted for use either as a standing or a working valve. In this type of valve the ball member is usually confined within a cage or crown and is capable of more or less movement laterally thereof in its seating and unseating movement incident to the pumping operation wherein the direction of pressure is changed. Under such conditions it is highly important that the valve member or ball be accurately guided toward and from its seat to prevent improper seating and consequent leakage, and such guiding means must be constructed to permit the maxium flow of liquid to pass the valve when in its raised position.

It is furthermore essential that the valve be limited in its upward travel by a stop bar which must be so disposed as not to interfere with the unrestricted flow of liquid through the valve case. The case for such a valve differs from the usual crown or cage with side discharge openings in that the entire flow must be through the valve case in a practically direct path to the connecting pipe.

This invention provides a novel construction of the valve case formed at its lower portion with a series of longitudinal ribs having radial contact faces extending from a valve seat and terminating at a point below a transverse stop bar disposed to limit the opening travel of the valve. The chamber surrounding this bar has deflecting walls at its upper end so that the circumferential current of liquid passing upward through the spaces between the ribs has a free passage about this bar and is then directed into a solid stream entering the outlet pipe.

The invention also contemplates the production of this improved valve case by a novel method of manufacture consisting in casting a tubular body with interiorly extending ribs and machining or finishing the contact face of said ribs to provide a guide surface of substantially the diameter of the cooperating valve member.

The invention has for an object to provide a novel and improved construction of valve case having coupling connections at its opposite ends and inwardly extending guide ribs spaced from and terminating beneath a transverse stop bar with the inner walls of the case above said bar inwardly deflected to merge a circumferential stream of liquid into a solid body at the outlet from the case.

A further object of the invention is to provide a novel method of producing a valve case which consists in forming a tubular body with interiorly extending ribs, each provided with an apex and removing such apex by a machining operation to produce a finished contact face having a curve substantially corresponding to that of the cooperating ball valve member.

Other and further objects and advantages of the invention will be hereinafter set forth and the novel features thereof defined by the appended claims.

In the drawing.

Like numerals refer to like parts in the several figures of the drawing.

In the various applications of the case the coupling connections are varied, for instance, in its use as a traveling valve, or a standing valve, and in the present instance it is shown as a standing valve.

Figure 1:
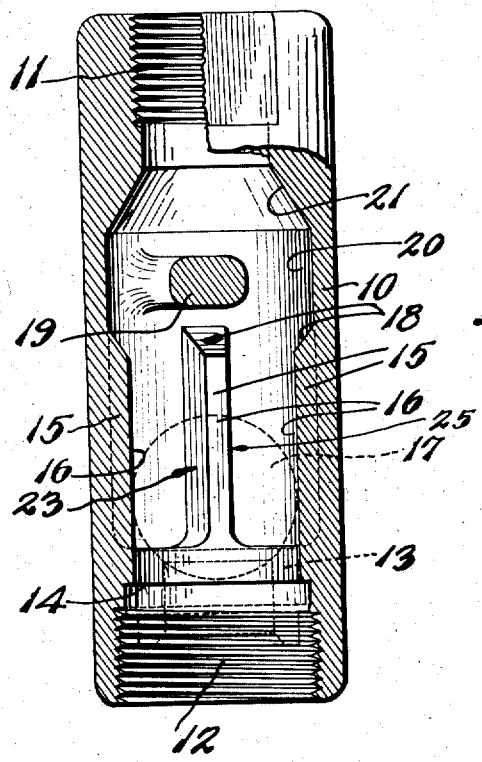
Fig. 1 is a central vertical section through the valve case with a part in elevation.
Figure 2:
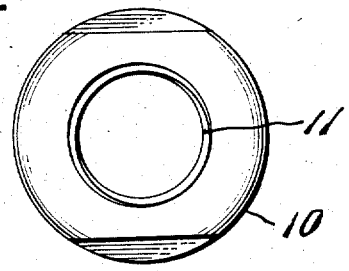
Fig. 2 is a top plan.
Figure 3:
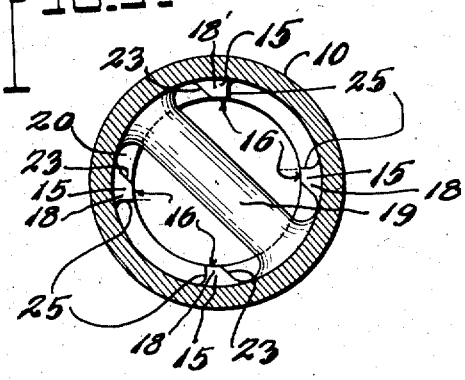
Fig. 3 is a section on line 3—3 of Fig. 1.
Figure 4:
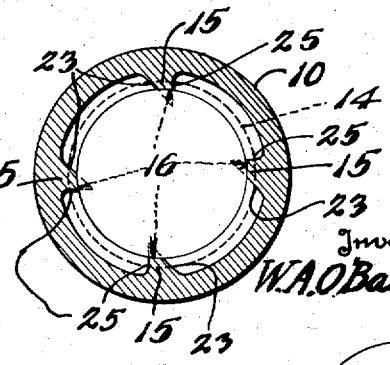
Fig. 4 is a similar view on line 4—4 of Fig. 1.

The case 10 is formed at its upper end with an interiorly threaded opening 11 for coupling to a suitable conduit and at its opposite end with an enlarged threaded opening 12 adapted to receive an inlet connection which also supports a valve seat 13, indicated by dotted lines in Fig. 1.

This seat engages an interior flange 14 at the lower portion of the case and from this flange a series of longitudinally extending ribs 15 project radially inwardly of the case. The inner or contact face 16 of these ribs is finished to provide an accurate and smooth contact with a ball member 17, indicated by dotted lines in Fig. 1. The upper ends of these ribs are beveled, as at 18, and they terminate beneath a transverse stop bar 19 disposed in the chamber 20 and spaced above the beveled ends of the ribs. This bar is cast integral with the case and the upper wall of the chamber above the bar is inclined inwardly, as at 21, to deflect the circumferentially rising current of fluid into a solid body at the outlet connection 11. This provides for a free and maximum flow of liquid directly through the case and about the valve when in unseated position.

Figure 5:
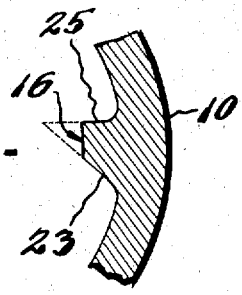
Fig. 5 is a detail section of one valve rib.

To facilitate the production of the valve case by a casting operation and the subsequent removal of the pattern, one wall 25 of the ribs is formed straight and the opposite wall 23 inclined while the spaces between these walls form circumferential channels about the ball member guided by the ribs. The ribs are preferably initially molded with an apex, as shown in Fig. 5, and this apex is subsequently removed by a finishing or grinding operation which provides the contact face of the rib having a slight concavity substantially corresponding to the spherical contour of the ball valve.

In the method of producing these castings they may be formed from steel, in which event it is desirable to subject them to a pickling operation in order to remove the core sand before the machining of the ribs and to reduce the tool expense in the production of the complete case. By this method of production the valve case is provided with ribs which accurately guide the valve therein and thus materially reduce the wear upon the ball and seat as well as the loss due to leakage of liquid passing the valve when not properly seated.

The construction of the case provides for the maximum flow of fluid therethrough in a direct stream which is merged from its circumferential path about the ball valve into a solid body at the discharge and such result is facilitated by the spacing of the ribs below the stop bar to provide a clear chamber surrounding the same having its upper wall inclined toward the outlet.

While the specific details of the construction have been shown and described, the invention is not confined thereto as changes and alterations may be made without departing from the spirit of the invention, as defined by the following claims.

What I claim is

A well pump fitting comprising a tubular valve casing having at one end a valve seat, a valve member coacting with said seat, guide ribs extending longitudinally of said casing and terminating intermediate the length of the fitting, and stop means for limiting the movement of the valve member away from its seat, said stop means being disposed adjacent the ends of the guide ribs at a point spaced therefrom less than the diameter of said valve member.

2. A well pump fitting comprising a valve casing, said casing being provided with a discharge passage at one end, a valve seat at the other end, a valve member adapted to coact with said valve seat, guide ribs extending longitudinally of the casing and terminating at a point spaced from the discharge passage, and stop means also disposed in spaced relation to the discharge passage and at a point to prevent movement of the valve member beyond the guide ribs.

3. The method of forming a valve case consisting in casting a tubular body with spaced interiorly extending ribs, and finishing the free inner edges of said ribs to form a guide surface of substantially the diameter of the cooperating valve member.

4. The method of forming a valve case consisting in casting a tubular body with interiorly extending ribs each provided with an apex, and removing the apex of said ribs to form a finished curved contact face for a cooperating ball member.

In testimony whereof I affix my signature.

WALTER A. O'BANNON.